US007644011B2

(12) United States Patent
Shkedy

(10) Patent No.: US 7,644,011 B2
(45) Date of Patent: Jan. 5, 2010

(54) METHOD AND APPARATUS FOR DETERMINING INVESTMENT MANAGER SKILL

(76) Inventor: Gary Shkedy, 9245 Regents Rd., Suite 322, San Diego, CA (US) 92037

( * ) Notice: Subject to any disclaimer, the term of this patent is extended or adjusted under 35 U.S.C. 154(b) by 916 days.

(21) Appl. No.: 11/043,382

(22) Filed: Jan. 26, 2005

(65) Prior Publication Data

US 2006/0167777 A1 Jul. 27, 2006

(51) Int. Cl.
*G06Q 10/00* (2006.01)
(52) U.S. Cl. .................. 705/11; 705/7; 705/35
(58) Field of Classification Search .............. 705/7, 705/11, 35
See application file for complete search history.

(56) References Cited

U.S. PATENT DOCUMENTS

| 5,608,620 | A * | 3/1997 | Lundgren | 705/1 |
| 7,395,235 | B2 * | 7/2008 | Dhurandhar et al. | 705/26 |
| 2001/0044766 | A1* | 11/2001 | Keyes | 705/36 |
| 2002/0049659 | A1* | 4/2002 | Johnson et al. | 705/37 |

OTHER PUBLICATIONS

Daniel, Kent, et.al. "Measuring Mutual Fund Performance with Characteristic-Based Benchmarks", 1997, The Journal of Finance, vol. 52, No. 3, Papers and Proceedings of the Fifty-Seventh Annual Meeting, Annual Finance Association, New Orleans, Louisiana, Jan. 4-6, 1997, pp. 1035-1058.*

Olken, et al; "Random sampling from hash files", Proceedings of the 1990 ACM SIGMOD international conference on management of data, Atlantic City, New Jersey, United States, pp. 375-386, Year of Publication: 1990.*

Manku, et. Al, Random sampling techniques for space efficient online computation of order statistics of large datasets, vol. 28, Issue 2 (Jun. 1999) pp. 251-262.*

Geltner, David; "How accurate is the NCREIF as a Benchmark, and Who Cares?", 1997, University of Cincinnati, Manuscript for submission to Real Estate Finance, Winter 1997 Issue, pp. 1-40.*

Ou-Yang, Hui, "Optimal Conracts in a Continuous-Time Delegated Portfolio Management Problem", Spring 2003, The Review of Financial Studies, vol. 16, No. 1, pp. 173-208.*

New product portfolio management: practices and performance RG Cooper, SJ Edgett, EJ Kleinschmidt—Journal of Product Innovation Management, 1999—sedok.narod.ru.*

Ron Surz, PPCA, Inc., Testimonials on Popular Index Portfolio Opportunity Distributions (PIPODs), Senior Consultant, Aug. 2003, vol. 6, No. 8, pp. 1-3.

* cited by examiner

*Primary Examiner*—Jonathan G Sterrett
(74) *Attorney, Agent, or Firm*—Norman R. Van Treeck; Sheldon Mak Rose & Anderson

(57) ABSTRACT

A method of evaluating an investment manager's skill includes determining a time frame including a plurality of time periods of a predefined duration over which to calculate statistics, generating a return distribution for each time period, obtaining return data for a manager for each given time period, standardizing the manager's return data for each given time period, and calculating measurement statistics to compare the manager's return data against the return distribution over the plurality of time periods.

20 Claims, 10 Drawing Sheets

METHOD AND APPARATUS FOR DETERMINING INVESTMENT MANAGER SKILL

TECHNICAL FIELD

The present invention is directed to a method and apparatus for determining investment manager performance and specifically a method and system for determining whether a particular manager has achieved his performance as a result of skill or luck.

DISCUSSION OF THE RELATED ART

Ever since investors have participated in capital markets, they have been concerned with portfolio performance. Initially, investors were happy just to be able to calculate the return on their investments, but with the advent of the Dow Index, for the first time investors were able to compare their returns or their manager's returns with the "market's" return.

In today's world, investors still compare their investments to the performance of the market, but the definition of the market has become more sophisticated. The most widely used methodology for measuring performance is to compare the manager to a, benchmark. Even the Securities and Exchange Commission (SEC) has mandated that mutual funds must publish a comparison of their performance compared to a benchmark. According to the Certified Financial Analysts (CFA) Institute, a benchmark is "an independent rate of return (or hurdle rate) forming an objective test of the effective implementation of an investment strategy." The CFA Institute further states that a benchmark may take any of the following forms:

(1) A well recognized published index;
(2) A tailored composite of assets (or indexes); or
(3) A peer group (or "universe") of similar funds or portfolios Techniques that measure performance typically use statistical methods to either compare the manager's return through time with that of the benchmark or to rank the manager according to some measurement statistic against a peer group and then average the rankings over time. The most widely used measurement statistics are total return, price return, capital preservation, and tax efficiency.

Modern Portfolio Theory provides the framework for portfolio or manager evaluation using statistical techniques. The most common approach to evaluate managers is to use the market model regression. This model is defined as follows:

$$R_i = \alpha_i + R_f + \beta_i(R_m - R_f) + e_i$$

where
- $R_i$ is the return on portfolio i,
- $\alpha_i$ is the excess return added by the manager after adjusting for the market,
- $R_f$ is the risk free rate or return,
- $R_m$ the return on the market,
- $\beta_i$ is the amount of risk represented by the portfolio relative to the market,
- $e_i$ is the error term.

In practice, the market model produces regression coefficients that vary depending on the time frame selected, i.e. they are not stable over time. However, it is still the most widely used model in finance.

There are two other popular measures of performance that are derived from the market model. The first is the Sharpe ratio, defined as:

$$S_p = \frac{\overline{R}_p - \overline{R}_f}{\sigma_p},$$

where $\overline{R}_p$ is the average portfolio return, $\overline{R}_f$ is the average risk free rates of return and $\sigma_p$ is the standard deviation of the portfolio return. If the Sharpe ratio is high then a manager is said to have skill.

The second measure of performance is called Treynor's measure and is defined as:

$$T_p = \frac{\overline{R}_p - \overline{R}_f}{\beta_p}$$

where $\beta_p$ is the calculated from the market model regression. Similar to the Sharpe measure, a high value of the Treynor measure is considered a good indicator of managerial skill.

Instead of a single factor model, managers are also measured using a multi-factor model. It has been observed that beside $\beta$, the returns of stocks could also be explained by using a quantity referred to as style. Style is loosely defined as large capitalization stock vs. small capitalization stock and value versus growth stocks. In performing these factor regressions, one can gain what is considered an estimate for a pure $\alpha$.

Those skilled in the art will know that there are other models in finance to evaluate a manger's skill, but these models, as well as the ones mentioned above, all have one or all of the following drawbacks.

(1) If an active manager changes the composition of his portfolio, he has changed the statistical distribution of returns. This is especially true if the manager has rotated out of one sector into another. Thus any statistical measurement of this dataset will result in erroneous results, as the basic premise of most of the statistical techniques used in finance is that the data come from the same distribution. This is especially true for the mean and standard deviation of portfolio returns through time.

(2) The distribution of market returns and stock returns are non-stationary over time, i.e. they do not have the same standard deviation over time. Once again any statistical measurement assuming stationarity will lead to erroneous results. Thus linear regression models will produce unstable estimates of the regression parameters.

(3) The number of data points needed to have a 95% confidence in the value of the measurement statistic far exceeds the average time a manager is active. By some estimates you need about 30 years of quarterly data to have 95% confidence in the measured a in the market model.

(4) In the case of some hedge funds where the portfolio $\beta$ is designed to be zero, the measures of performance either become meaningless or result in ridiculous solutions.

The other most common method of defining a benchmark is using a peer group universe. Here a universe of similar managers is constructed and the returns or other measurement statistic of each manager is then ranked. The higher a manager's rank the better the manager's performance. The idea being that if a manager can outperform his peers than he is a good manager.

Peer groups are subject to classification problems and survivor bias. Classification relates to the definition of the peer group. For example, suppose the universe is defined as large cap equity managers. If each manager does not have the exact same investment constraints, e.g. no more than 5% in any one issue and no more than 15% in any one industry, then their risk return profiles are completely different and their results are not comparable.

In 2002 Ronald Surz of PPCA Inc. developed a technique whereby he generated random portfolios to construct a simulated peer universe. (See "Testimonials on Popular Index Portfolio Opportunity Distributions", Senior Consultant, Vol. 6, No. 8, August 2003, published online at www.srconsultant.com/PIPODs/Testimonials.pdf.) He then ranked the simulated outcomes and calculates the percentiles, effectively calculating the cumulative return distribution. Then, given a managers return for the period, he could rank a manager according to his/her relative performance to the generated peer group. This technique does not suffer from survivor bias and presumably can control for classification. The output of this system is a ranking based on the number of securities in the portfolio. Surz has not published his methodology for generating portfolios and one can only infer what he has done.

Ranking systems are unable to distinguish whether performance is due to luck or skill. Without standardizing, there is no statistically correct way to aggregate information collected in rankings across different distributions. Nevertheless, market practitioners resort to averaging ranks over different time periods, although this technique suffers the same problems as the statistical techniques discussed above. Surz states that his technique "will not help with manager selection when the universe of managers is large. This is because the top performers will be top performers against a reasonable universe."

SUMMARY OF THE INVENTION

Exemplary embodiments of the invention as described herein generally include methods and systems for calculating an investments manager's skill level given a reasonable amount of historical data. The present invention is based on the fact that a Manger's portfolio will change over time. The methods of the invention can verify that portfolio distributions are non-stationary and have extensions that minimize the number of years of data needed for a 95% confidence band. The present invention provides investors with the ability to verify if a manger posses the necessary skill to manage their investments. Currently, many investors are paying managers fees to manage their investments and those managers have just been lucky.

Another object of the invention is to subdivide the universe into sectors in order to increase the number of data points.

It is another object of the invention to provide a mechanism for calculating the fair incentive fees an investor should pay the investment manager.

It is yet another object of the invention to provide performance attribution of a managers performance.

It is another object of the invention to provide style analysis of a particular fund.

In one aspect of the invention, a method for using a computer to calculate a measurement statistic in order to determine whether a manager has skill comprises the steps of: defining a universe of possible securities, generating the return distribution for the universe for every time period, standardizing the managers return with respect to each, return distribution and calculating the measurement statistic.

In another aspect of the invention, a computer based method is provided for calculating a measurement statistic to determine the skill of an investment manager, comprising defining a universe of possible securities, generating a return distribution for the universe per time period, standardizing the managers return with respect each return distribution, and calculating the measurement statistic.

According to another aspect of the invention, a device having a stored program executable by a computer is provided to facilitate the calculation of the measurement statistic to determine manager skill; the stored programs causing the computer to execute method steps including the steps described above.

DETAILED DESCRIPTION OF THE PREFERRED EMBODIMENTS

Exemplary embodiments of the invention are described below. In the interest of clarity, not all features of an actual implementation which are well known to those of skill in the art are described in detail herein.

A system and method according to the present invention is provided for calculating a measurement statistic in order to determine the skill of an investment manager. The investment managers described herein will be managers of stock, bond and commodity funds but it should be understood that the invention is applicable for all type of investment managers including hedge fund, real estate and private equity managers to name a few. In addition, the same methodology could also be used to evaluate the effectiveness of investment advisors, financial newsletters and financial analysts. The illustrative method and system according to the present invention provide a method for combining statistics from different distributions in order to calculate an aggregate measurement statistic.

Figure 3:
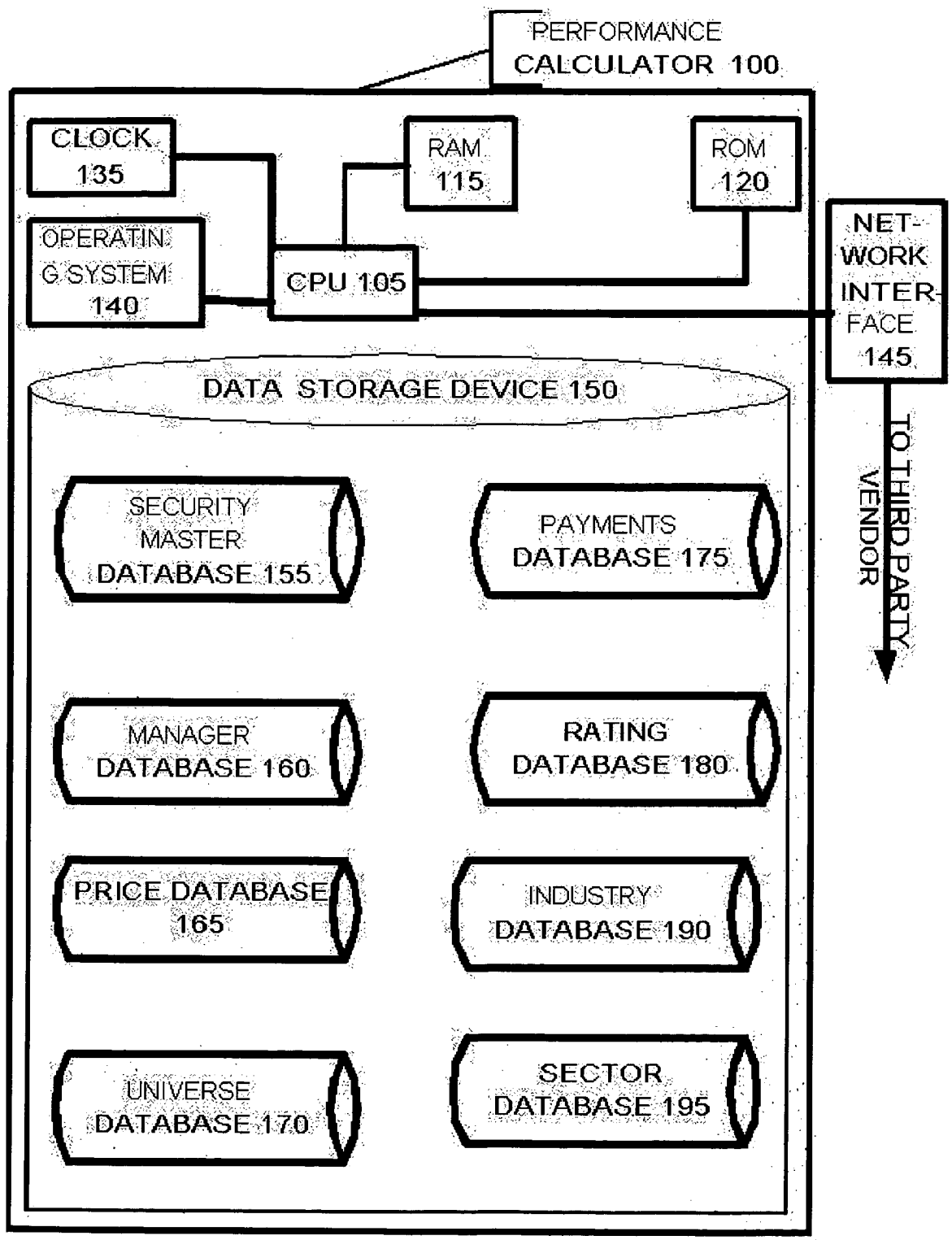
FIG. 3 illustrates the system architecture of an apparatus and method of the present invention, according to an embodiment of the invention.

The system architecture of an apparatus and method of the present invention, according to an embodiment of the invention, is illustrated with reference to FIG. 3. As shown in FIG. 3, performance calculator 100 includes central processor (CPU) 105, RAM 115, ROM 120, clock 135, operating system 140, network interface 145, and data storage device 150.

A conventional personal computer or computer workstation with sufficient memory and processing capability may be used as performance calculator 100. Performance calculator 100 should be capable of high volume processing including performing mathematical calculations such as generating random numbers and searching databases. A microprocessor such as the 3.2 GHz Pentium 4, commonly manufactured by Intel Inc., can be used for CPU 105. This processor employs a 32-bit architecture. Other exemplary processors include, but are not limited to, the AMD Athlon MD processor and the Sun Microsystems UltraSPARC-IIIi processor.

Data storage device 150 may include hard disk magnetic or optical storage units, as well as CD-ROM drives or flash memory. Data storage device 150 contains databases used in the calculation of measurement statistics. These include security master database 155, manager database 160, price database 165, universe database 170, payments database 175, rating database 180, industry database 190, and sector database 195. According to one embodiment of the invention, database software such as Oracle10g, manufactured by Oracle Corporation, is used to create and manage these databases.

Security master database 155 maintains data on the different securities that can be selected for inclusion within a universe, including fields such as ID number, Ticker, coupon, maturity, domicile, currency, shares outstanding, cusip, sedol, etc. This information can either be stored locally or maintained by a third party vendor.

Manager database 160 maintains data on the historical performance of managers, including fields such as manager ID, manager name, managers fund name, date, price, return, sector return etc. A third party data vendor could also maintain this data.

Price database 165 maintains historical price data on all the securities in the security master database 155. It includes fields such as ID, date, price etc. This database could also maintain adjusted prices that are historical prices that have been adjusted for corporate actions such as splits, etc.

Universe database 170 maintains a list of previously defined universes including, fields such as universe ID, date, security ID, universe name, quantity etc. The universe database could include public indices such as the S&P 500, the Wilshire 5000, etc. In addition, these universes could change over time and so can include a date field.

Payment database 175 tracks all payments that are made to the holders of the securities in the security master database 155, including fields such as security ID, payment type, date, amount, etc. The typical payments that would be found in the database are dividends and coupon payments. This data is used for calculating total returns as opposed to price return.

Rating database 180 contains the rating of those securities that are rated by rating agencies. These ratings normally relate to the investment quality of bonds and are provided by companies such as Moody's Investor Service and S&P. The fields in this database include security ID, rating agency, rating etc. This database is useful for defining bond universes.

Industry database 190 maintains the industry identification for the companies that issue the securities in the security master. The fields in this database include security ID, industry ID, industry name etc. For example, this database would have information such as the Dell stock is in the computer hardware industry and Ford bonds are in the automobile industry.

Sector database 195 stores previously defined sectors with fields such as sector ID, security ID, sector name, etc. This database could also just store the filters used to define the sectors.

According to one embodiment of the present invention, all the databases are, stored locally, but they could be stored at a remote site including a third party data vendor such as Compustat or Datastream.

Network interface 145 is a gateway to communicate with third party data vendors. Conventional internal or external modems may serve as network interface 145. Network interface 145 supports modems at a range of baud rates from 1200 upward, but may combine such inputs into a TI or T3 line if more bandwidth is required. According to one embodiment of the present invention, network interface 145 is connected with the Internet and/or any of the commercial on-line services such as America Online.

While the above embodiment describes a single computer acting as performance calculator 100, those skilled in the art will realize that the calculations can be distributed over a plurality of computers.

The method and apparatus of the present invention will now be discussed with reference to FIG. 1. According to an embodiment of the invention, the present invention includes performance calculator 100 and the associated databases.

Figure 1:
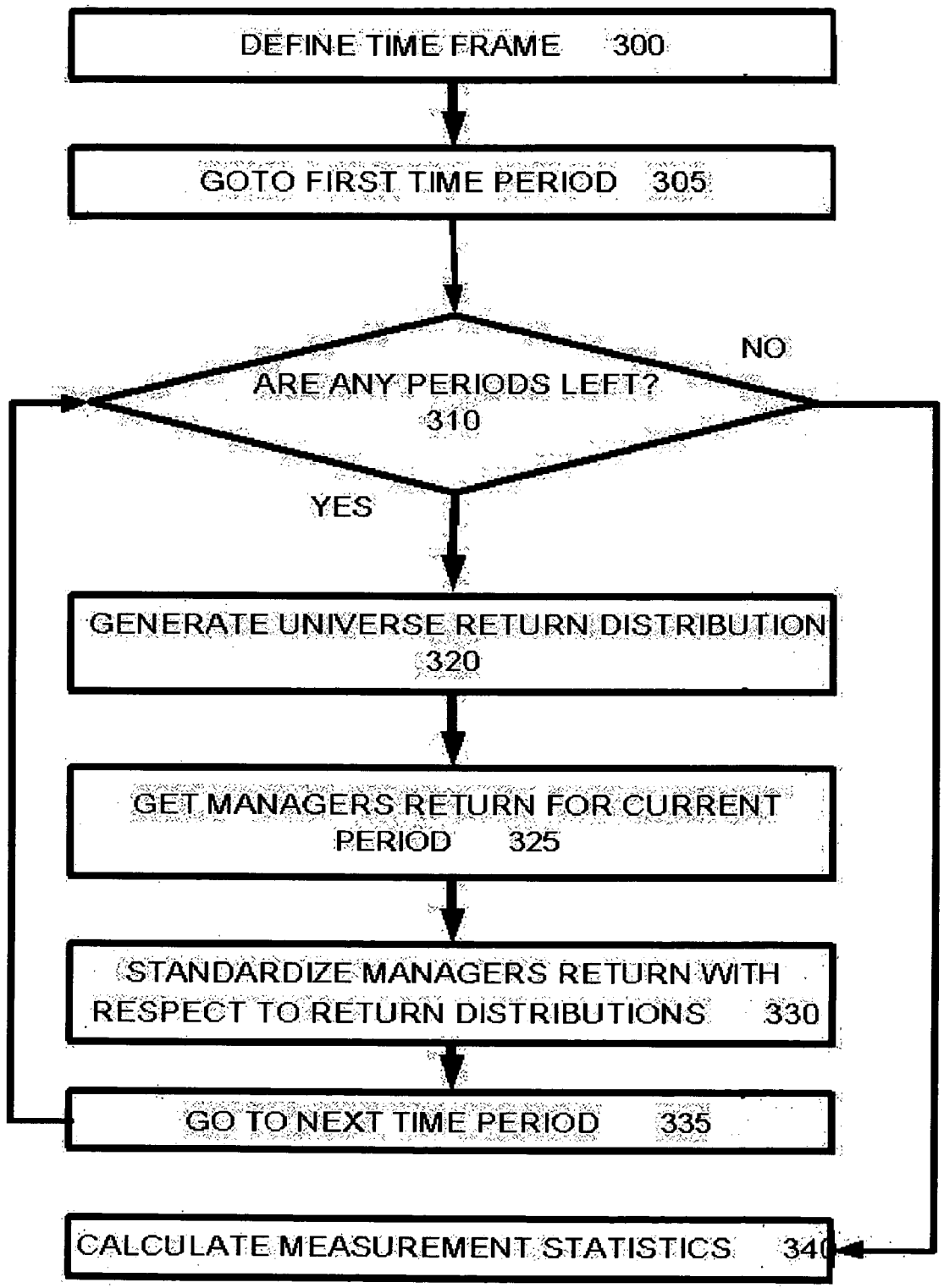
FIG. 1 depicts a flow chart illustrating how a measurement statistic is calculated, according to an embodiment of the invention.

FIG. 1 depicts a flow chart illustrating how a measurement statistic is calculated, according to an embodiment of the invention. At step 300 the system defines the time frame, which will be used to calculate the statistic. As part of defining the time frame, the system will also determine the period length of each step. For example, the time frame could start at Mar. 31, 2004, go back 5 years of quarterly steps or start at Sep. 30, 2004 and go back 2 years of monthly steps. Those skilled in the art will know that this is equivalent to defining the number of data points as well as the starting point. At step 305, the system starts at the first time period.

Figure 2:
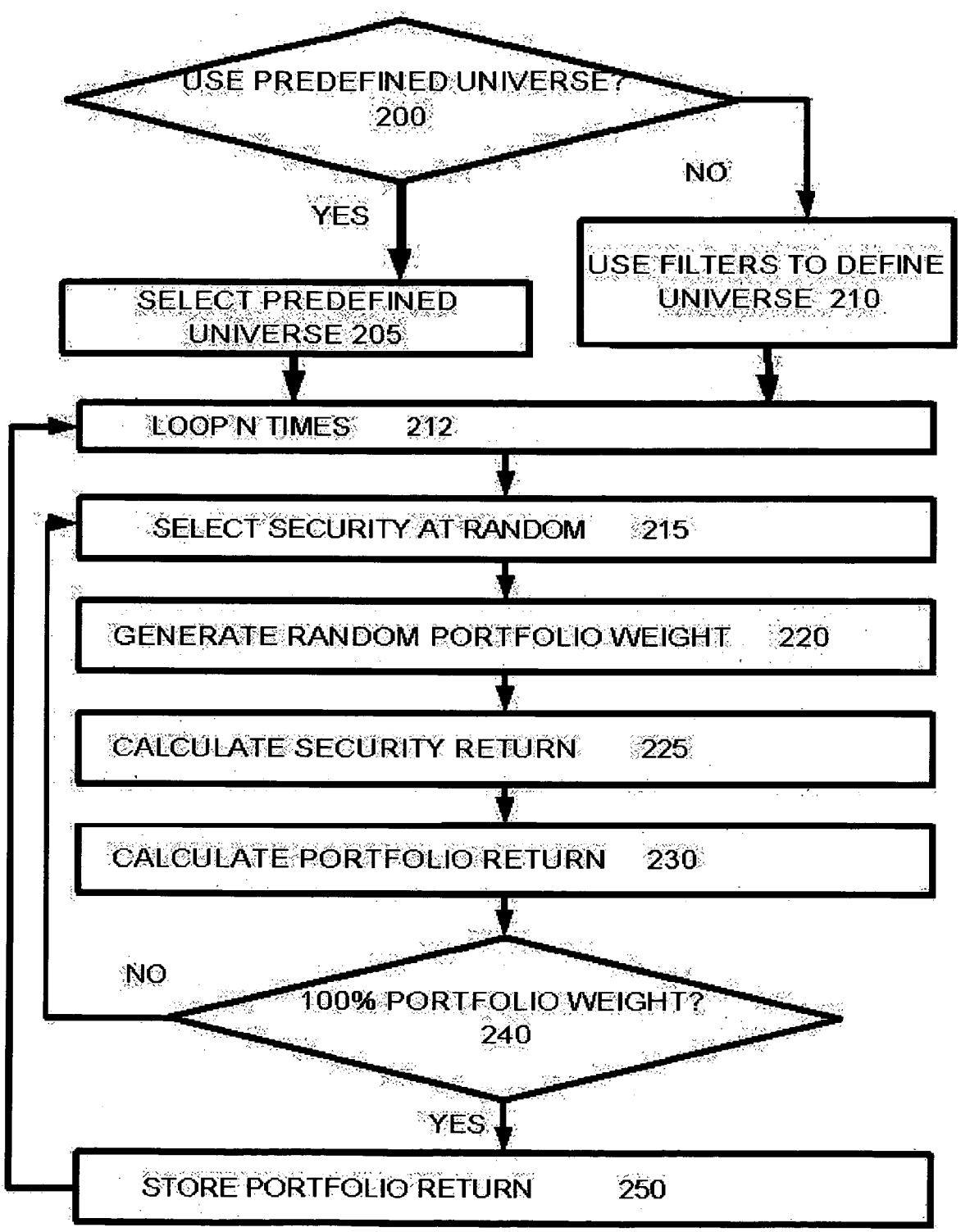
FIG. 2 depicts a flow chart illustrating how a return distribution is generated for a universe for a given time period, according to an embodiment of the invention.

Step 310 is a conditional check to see if there are any more time periods left to step over. This is the beginning of the calculation loop. If there are no more steps to calculate, go to step 340 and calculate the measurement statistics. If there are more steps, go to the next step. At step 320, the system generates the universe return distribution. A detailed description of a method of step 320, according to an embodiment of the present invention, is shown in FIG. 2. The result of this step is that the system has the probability distribution for all portfolios in the chosen universe for the given time period. According to one embodiment of the invention, the returns are assumed to be normally distributed. As a result, the mean and standard deviation are sufficient to describe the distribution. Other probability distributions not explicitly mentioned herein are also included within the scope of the present invention. Those skilled in the art will know that the return distributions could be pre-calculated and stored, and so step 320 will include retrieving the distribution from the database.

At step 325, the system gets a manager's return for the current time period. This data could be in the manager database 160 or a flat file inputted by the user. At step 330 the system standardizes the managers return with respect to the return distributions. According to one embodiment of the present invention, the system would convert the manager's return to a standard normal. However, one skilled in the art will know that the standardization will depend on the functional form of the return probability distribution. Step 335 is the end of the loop and sends the system back to step 310 to go to the next time period.

Step 340 calculates the measurement statistics. According to one embodiment of the present invention, the system calculates the mean and standard deviation of the standardized normals. The resulting measurement statistics could then be used to calculate a confidence interval for the mean or to perform a simple hypothesis test on whether the mean is positive, that is, whether the manager has skill. If the mean tests to be zero, then the manager was just lucky, and if the mean tests to be negative, the manager is either overpaid or has skill in losing money. Those skilled in the art will know that the measurement statistic can also be calculated using other statistical techniques such as regression, analysis of variance, factor analysis, principal component analysis, etc.

Those skilled in the art will know that the measurement statistic could be set to measure any desired statistic that would measure a manager's skill against the required variable.

According to another embodiment of the present invention, the measurement statistic could be changed to measure the ability of the manager to preserve capital.

According to another embodiment of the present invention, the different measurement statistics are combined to form a new measurement statistic. An example would be a statistic that measured the maximization of total return while ensuring preservation of capital.

According to another embodiment of the present invention, the system could calculate a measurement statistic that determines the fair value an investor should pay a manager. Those skilled in the art will know that once the probability distribution of returns is known, one can use utility theory to determine the fair value to pay a manager.

Turning now to FIG. 2, this figure depicts a flow chart illustrating how a return distribution is generated for a universe for a given time period, i.e. step 320 of FIG. 1, according to an embodiment of the invention. For example, the system could generate the quarterly return distribution for the S&P 500 for the period Jan. 1, 2004 to Mar. 31, 2004. The universe of assets will be generated according to the manager's mandate. That is, if a manager is managing portfolios of U.S. stocks, the universe will be that of U.S. stocks. Alternatively, if the manager is investing Japanese bond portfolios, then the universe is that of all Japanese bonds, etc. At step 200, the system determines if the user wants to use a predefined universe. If the user decides "yes", then at step 205 the system will select the predefined universe they have chosen from the universe database 170. A, predefined universe could be an existing index such as the S&P500 index or the Lehman Brothers Aggregate Bond Index. If the user decides "No", then at step 210, the system uses a set of filters to define the universe. A filter could be a set of logical conditions, such as those embodied in one or more SQL statements, defined to select a specified set of securities from the security master database 155, or a list of security IDs. For example, a user could select all US equities that have a market capitalization greater than $1 billion and are domiciled in the USA. Those skilled in the art will know that the universe could change over different time periods.

Step 212 is the beginning of the generation loop. The system generates N (which is predefined by the user) different portfolio returns from the universe of portfolio returns in order to complete the sample distribution. That is, at the beginning of each loop, a number of returns are selected from the universe of returns to define a current portfolio. For example, the system could generate 1 million different portfolio returns to define the return distribution. Those skilled in the art will know that a larger N results in smaller errors in the sample distribution.

At step 215, the system selects a security from the current portfolio at random. The process of generating a random number is well known in the art. Those skilled in the art will know that the sampling could be from any distribution, with or without replacement. According to an embodiment of the present invention, the system generates uniform random variables to select a security at random. Once a security has been selected, at step 220 the system generates a random weight for the security in the portfolio. Those skilled in art will know that the methodology for generating a random weight is the same as the random selection process except that the random weight is between 0% and 100%. In another embodiment of the present invention, the weight could be generated between 0% and the portion of the portfolio that is unallocated. According to another embodiment, the weights are generated from a uniform random distribution, but again the distribution for generating weights could be any distribution.

At step 225, the system calculates the security return. The system calculates the security return by multiplying the actual security return by the generated weight of step 220. This actual security return is calculated using the price database 165 and the payment database 175. The calculation of a price return or a total return is well known in the art. At step 230 the system calculates the portfolio return by adding the current security's contribution as calculated in step 225 to the existing portfolio return.

At step 240 the system checks if it has allocated 100% of the portfolio weight, that is, if it has accounted for 100% of the securities in the portfolio. Those skilled in the art will know that in order to model the effects of leverage, the total portfolio weight can be increased by the amount of leverage. If there is still an unallocated percentage then the system loops and goes back to step 215, otherwise the system goes to step 250 and stores the current portfolio return. If the system has completed N loops it stops otherwise it returns to step 212 and generates a new portfolio return.

Figure 4A:
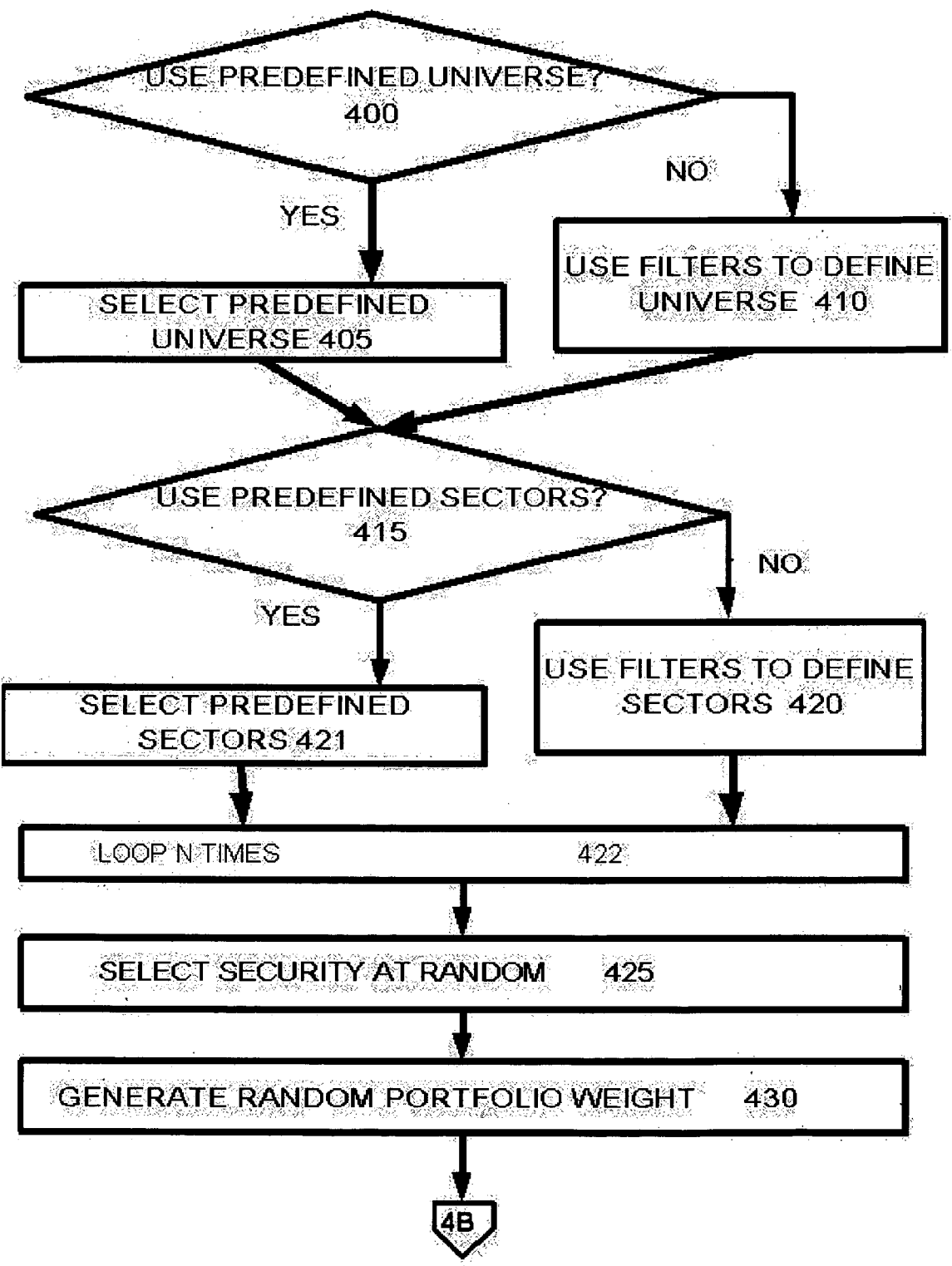
FIGS. 4a-b depict a flow chart illustrating how the return distribution is calculated when the universe is segmented into sectors, according to an embodiment of the invention.
Figure 4B:
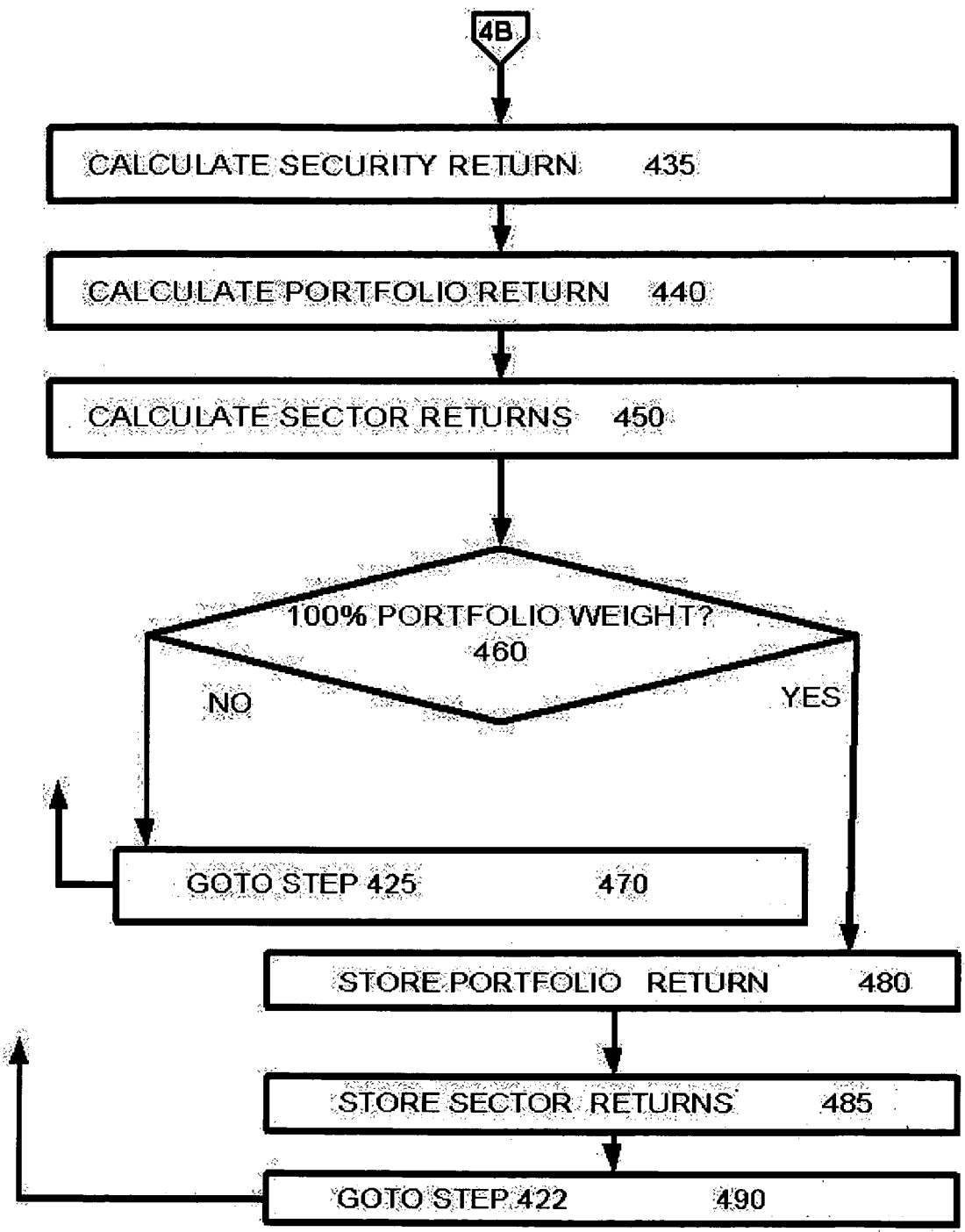

According to another embodiment of the present invention, the universe of securities is segmented into sectors. This is useful when there are not enough data points to calculate a meaningful measurement statistic by just using the universe on its own. An example of a sector could be an industry sector, or the segmentation of bonds into maturity and quality rating bands. FIGS. 4a-b depict a flow chart illustrating how the return distribution is calculated when the universe is segmented into sectors, according to an embodiment of the invention. Referring now to FIG. 4a, the actions of steps 400, 405 and 410 are the same as those for steps 200, 205 and 210 of FIG. 2. Moving on to step 415, the system determines if the user wants to use predefined sectors. If the user does want predefined sectors, then at step 421 the system will select the predefined sectors as defined in sector database 195. Otherwise, at step 420 the system would use user-defined filters to define the sectors. The action of step 422 is the same as that of step 212, which is the beginning of the portfolio generation loop. At step 425 the system selects a security at random. At step 430, the system generates the weight of the security in the portfolio. Moving on the FIG. 4b, at step 435 the system calculates the security's return. At step 440, the system calculates the portfolio return. At step 450, the system identifies which sector the security belongs to and adds the security's return to that sector's return.

Step 460 checks to see if the portfolio is fully allocated to 100% of the portfolio weight. If it is not allocated, the system goes back to step 425 (FIG. 4a) to select another random security. If it is allocated, then at step 480 the system stores the portfolio return. At step 485, the system stores all the sector returns. Step 490 is the end of the loop and the system will return to step 422 (FIG. 4a) until all N loops are complete.

According to another embodiment of the present invention, the system could calculate the attribution of the manager's portfolio to each of the sectors.

Figure 5A:
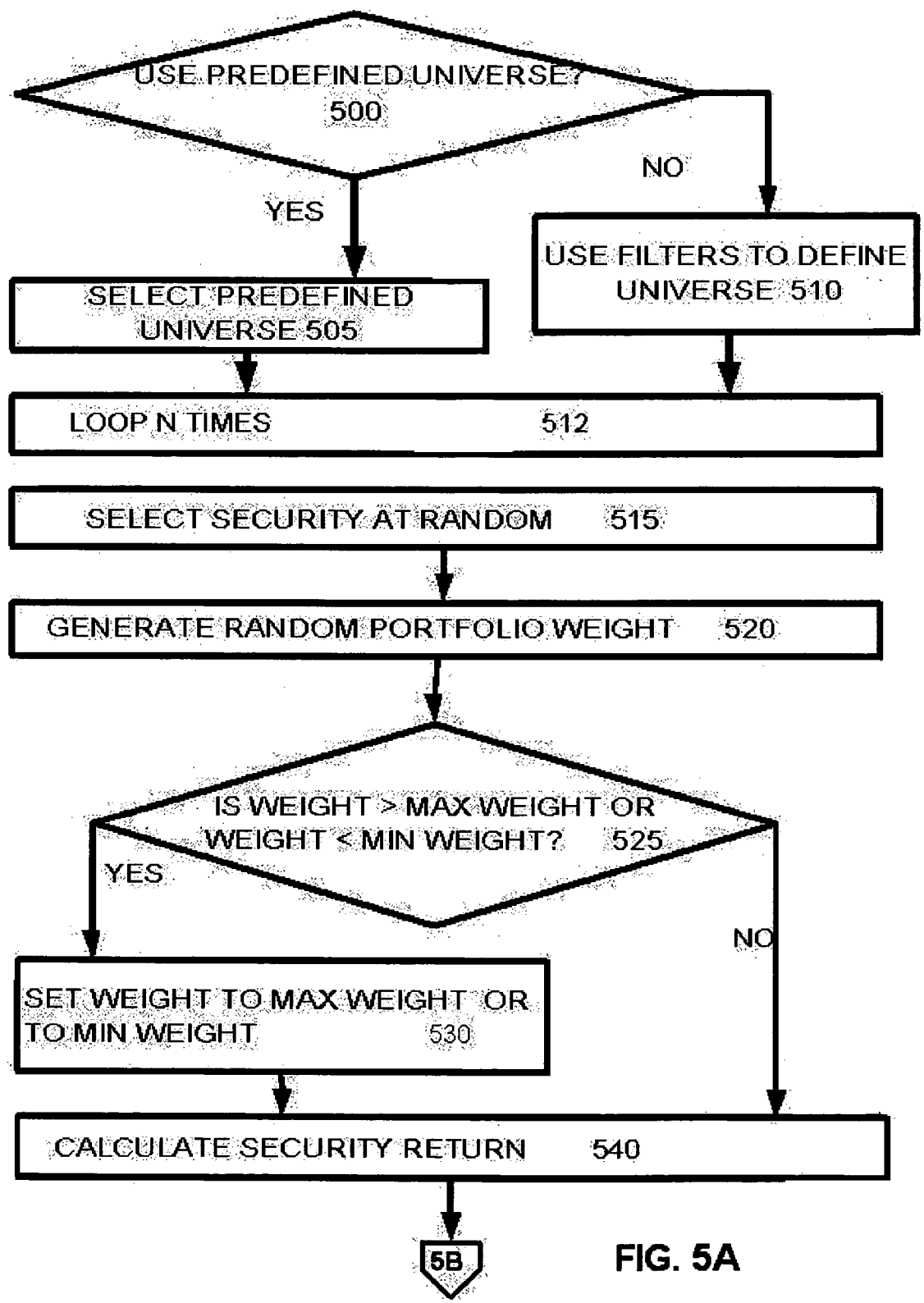
FIGS. 5a-b depict a flow chart illustrating how the return distribution is calculated for a universe subject to the constraint that the security weight is less than some maximum and greater than some minimum, according to an embodiment of the invention.
Figure 5B:
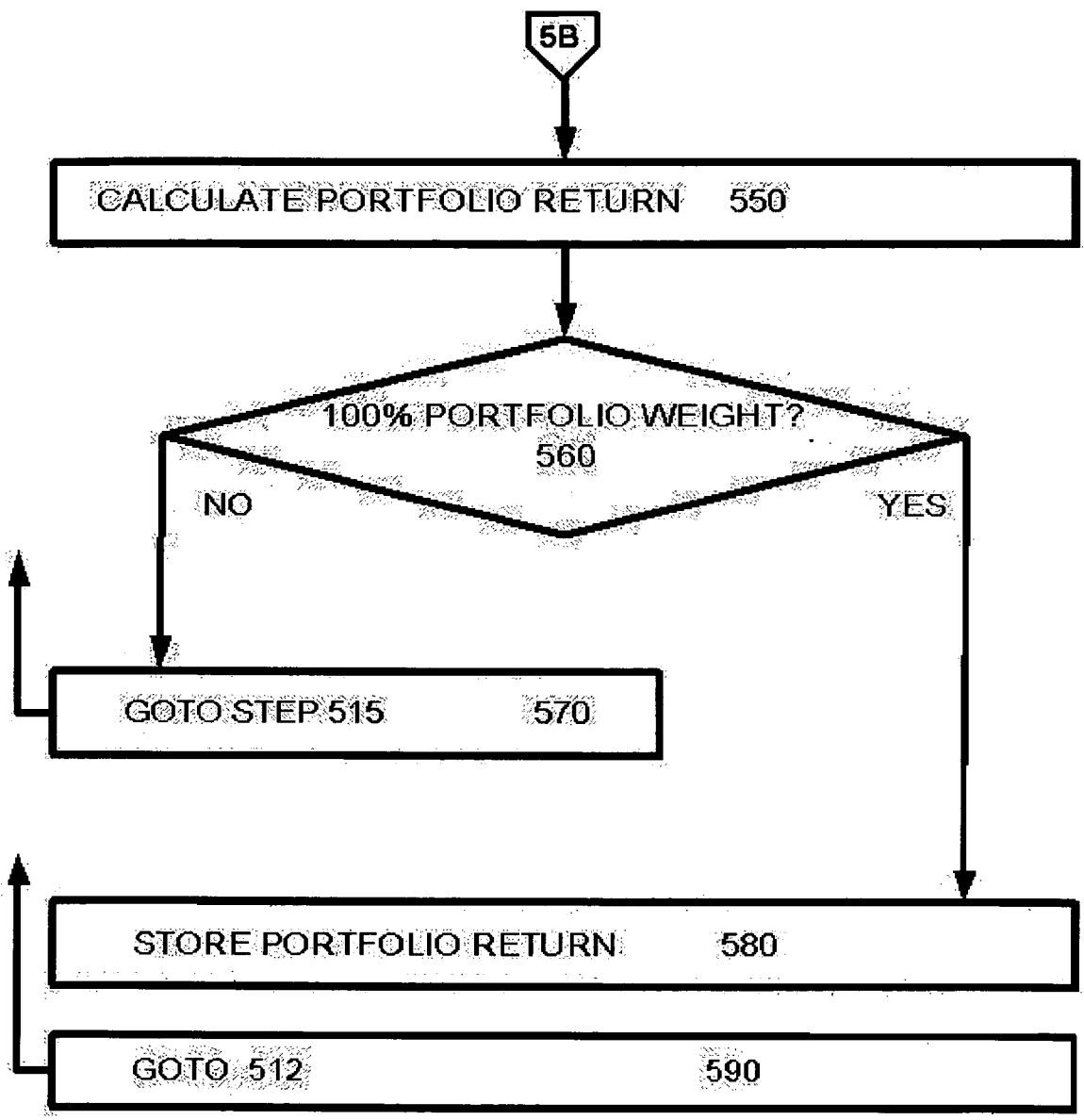

In another embodiment of the present invention, the weight of each security selected for inclusion in the generated portfolios is constrained to be below some maximum weight and greater than some minimum weight. This process ensures diversification, and in practice it is customary to restrict the maximum percent a manager can allocate to any one security. Most mutual funds are restricted by law not to invest more than 5% of their portfolio in any one security and they are also restricted from selling any security short. These constraints are also part of the manager's mandate. FIGS. 5a-b depict a flow chart illustrating how the return distribution is calculated for a universe subject to the constraint that the security weight is less than some maximum, according to an embodiment of the invention. With reference to FIG. 5a, the actions of steps 500, 505 and 510 are the same as those for steps 200, 205 and 210 of FIG. 2. The action of step 512 is the same as that of step 212, which is the beginning of the portfolio generation loop. At step 515 the system selects a security at random. At step 520, the system generates the random weight of the security in the portfolio. Step 525 is a check to see if the generated weight is greater than the maximum allowed weight or less than the minimum. If either of these conditions holds, then at step 530, the security weight is either set to the maximum weight if the weight was greater than the allowed maximum, or set to the minimum if the weight was less than the allowed minimum. If the generated weight is not greater then the maximum weight and not less than the minimum weight then the system goes to step 540. Step 540 is the calculation of the security's return. Referring now to FIG. 5b, at step 550 the system calculates the portfolio return.

At step 560 the system checks to see if the portfolio is fully allocated to 100% of the portfolio weight. If it is not allocated the system goes back to step 515 (FIG. 5a) to select another security. If the portfolio is fully allocated, then at step 580 the system stores the portfolio return. Step 590 is the end of the loop and the system returns to step 512 (FIG. 5a) until all N loops are complete. Those skilled in the art will know that the maximum or minimum could be different for all securities even though the process described here assumes the maximum and minimum are the same. The only difference is that at step 525 the system will check against the security maximum or minimum instead of the global maximum or minimum.

According to another embodiment of the present invention, steps 520, 525 and 530 are combined into one step. In this one step, the system generates a random weight from a distribution that has a maximum value equal to the desired maximum and a minimum value equal to the desired minimum. For example, the system can generate a weight from a uniform distribution between 0 and 5%.

Figure 6A:
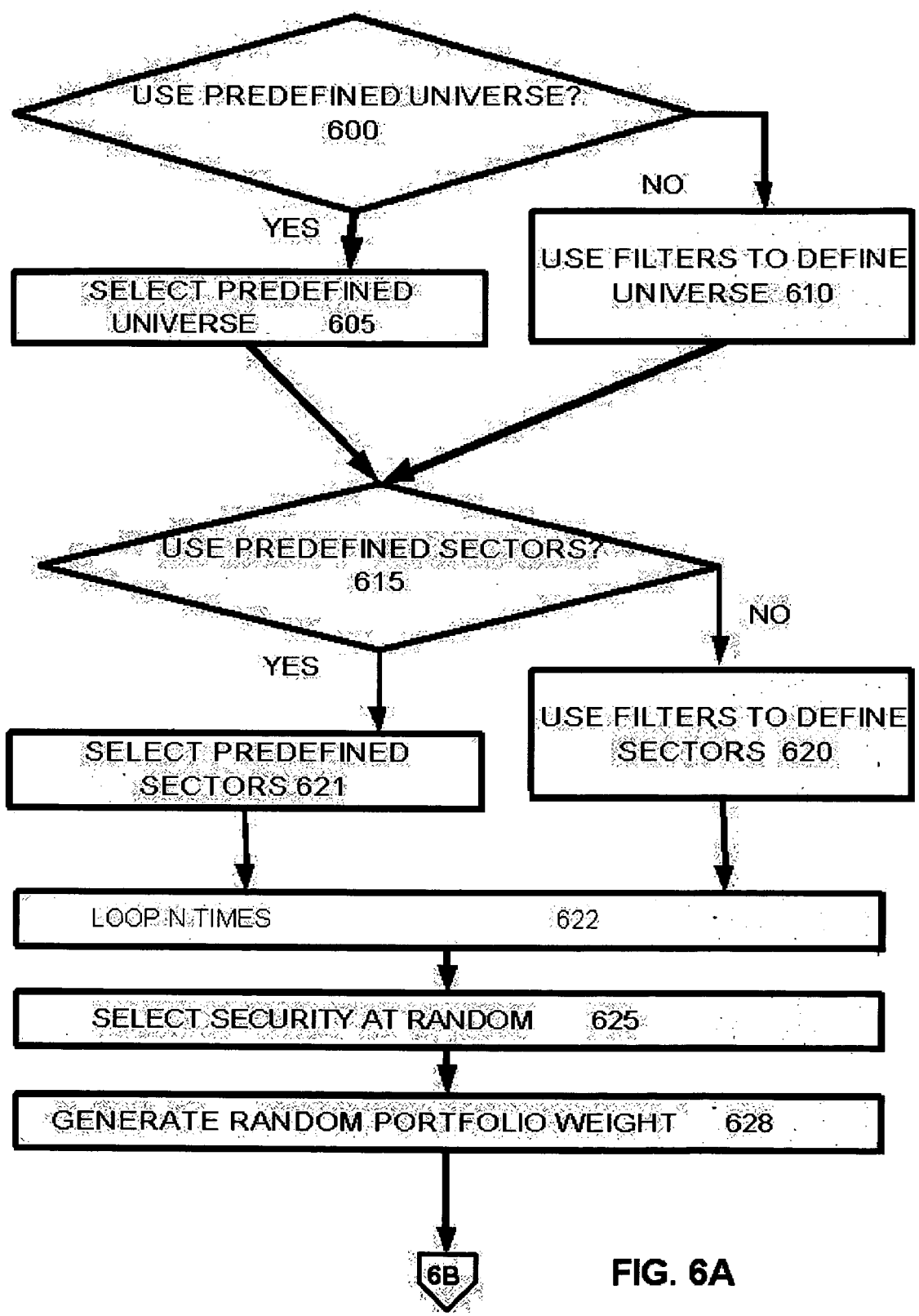
FIGS. 6a-c depict a flow chart illustrating how the return distribution is calculated for the universe subject to the constraint that the total security weight in any one sector is less than some maximum and greater than some minimum, according to an embodiment of the invention.
Figure 6B:
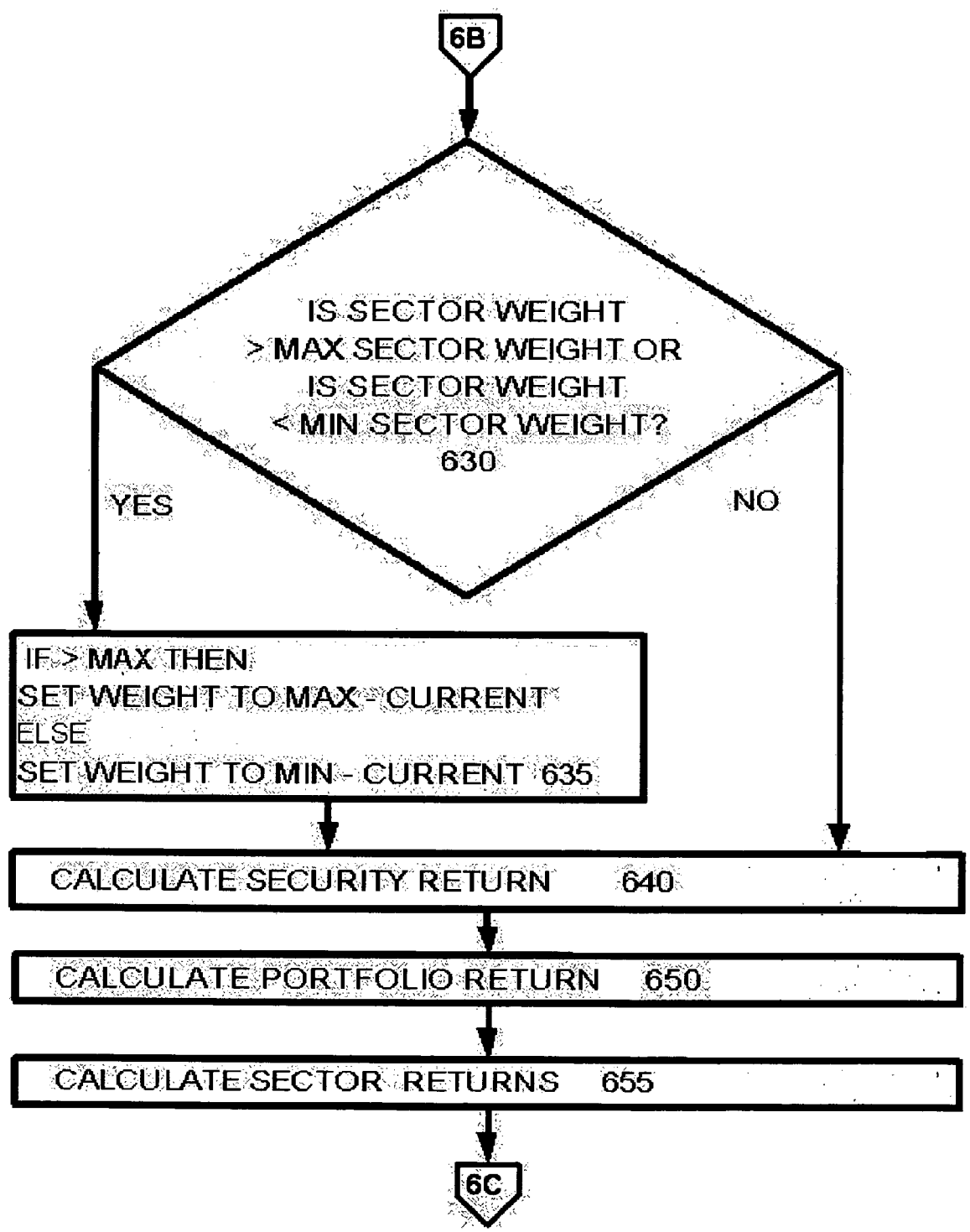
Figure 6C:
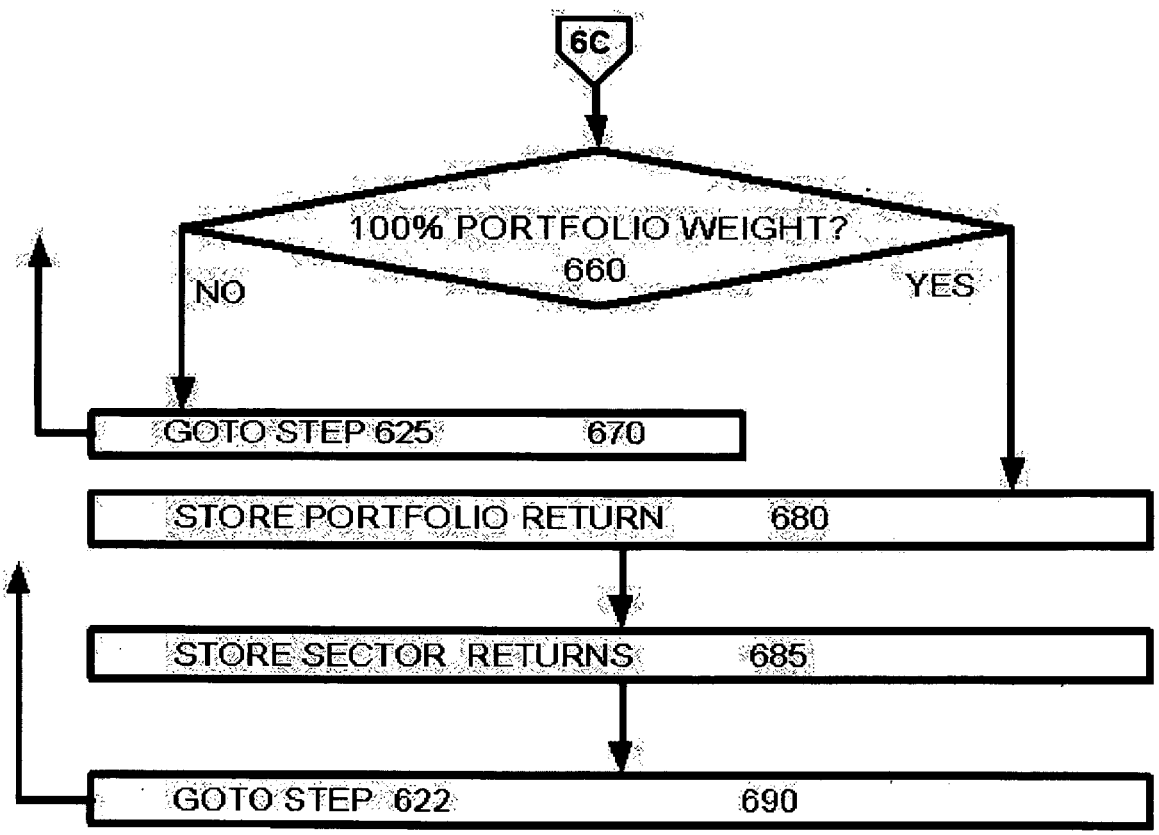

According to another embodiment of the present invention, the total weight of all the securities in any one sector of the portfolio is constrained to be below a maximum weight and above a minimum weight. Similarly, the weight in any one industry within a given sector could be constrained. This ensures diversification of the portfolio across all the sectors. FIGS. 6a-c depict a flow chart illustrating how the return distribution is calculated for the universe subject to the constraint that the total security weight in any one sector is less than some maximum, according to an embodiment of the invention. With reference to FIG. 6a, the action of steps 600, 605 and 610 are the same as those for steps 200, 205 and 210 of FIG. 2. In addition, the actions of steps 615, 620 and 621 are the same as those for steps 415, 420 and 421 of FIG. 4. The action of step 622 is the same as that of step 212 of FIG. 2, which is the beginning of the portfolio generation loop. Referring now to step 625, the system selects a security at random. At step 628, the system generates the random weight of the security in the portfolio. Moving on the FIG. 6b, step 630 is a check to see if adding the selected security to the portfolio makes the total sector weight exceed the maximum allowed weight for that sector or if adding the security makes the total sector weight go below the minimum allowed weight for the sector. If it is greater than the max, then at step 635, the security weight is set to the maximum weight of the sector minus the current weight in the sector. If it is less than the minimum, then at step 635, the security weight is set to minimum weight of the sector minus the current weight in the sector. If the generated total sector weight is not greater than the maximum weight or not less than the minimum weight, the system goes to step 640. Step 640 is the calculation of the security's return. At step 650 the system calculates the portfolio return and at step 655 calculates the sector's return.

Referring now to FIG. 6c, at step 660 the system checks to see if the portfolio is fully allocated to 100% of the portfolio weight. If it is not allocated, the system goes back to step 625 (FIG. 6a) to select another security. If the portfolio is fully allocated then at step 680 the system stores the portfolio return, and at step 685 the system stores the all the sectors returns. Step 690 is the end of the loop and the system returns to step 622 (FIG. 6a) until all N loops are complete. Those skilled in the art will know that the maximum or minimum weight could be different for all sectors even though the process described here assumes the maximum and minimum weight is the same. The only difference is that at step 630 the system will check against the sector maximum or minimum instead of the global maximum minimum.

According to another embodiment of the present invention, both the security weight and the sector weight can be constrained simultaneously. In this embodiment, referring now to FIG. 6b, step 640 would be replaced by steps 525, 530 and 540 from FIG. 5a.

According to another embodiment of the present invention, the security weights could be either positive or negative. This is especially true for market neutral hedge funds, which would also constrain the sector weight and the total portfolio weight to be zero.

According to another embodiment of the present invention, the historical returns or prices of the securities could be transformed by a mathematical transformation before the calculations are performed. An example of this is taking the natural log of the returns before calculating the return distributions. Another example is the use of excess returns as opposed to absolute returns.

According to another embodiment of the present invention, the system could randomly generate the number or quantity of securities in each portfolio as opposed to the weight of the security in the portfolio. This process would generate portfolio values instead of returns. In order to calculate the return distribution, the portfolio value would be divided by the initial investment to get a return. Those skilled in the art will know that this is just a simple transformation of units to weights.

According to another embodiment of the present invention, instead of using securities as the basic instrument, the system could use portfolios. This would be especially useful in measuring the effectiveness of a fund of a fund manager. In this case the resulting portfolio is made up of constituent portfolios and not constituent securities. Thus, the skill of this manager is based on how well he or she selects other managers and how he or she weights their different weights in the fund of funds.

Other applications and advantages of the present invention are described below.

(1) An investor wants to invest his money in a mutual fund that has a 95% probability of beating the S&P500.

(2) A pension find wants to invest in hedge funds but will only invest with managers who have a 98% probability of exceeding the average return of the generated portfolios.

(3) A pension consultant evaluating a hedge fund manager who wants 5% of assets under management as a fee.

(4) An investor wants to invest with a manager who has a 99% probability of preserving their capital.

(5) A pension fund wants to invest money with a manager who has achieved the highest risk adjusted return measured with 95% confidence.

(6) An individual wants to measure the effectiveness of the advice from an investment newsletter.

(7) A bank launching a new find of funds that only includes managers who have a 3-year track record of beating their benchmark with 95% confidence.

(8) An investor creating a manager ranking system based on the total return measurement statistic.

It is to be understood that since the exemplary systems and methods described herein can be implemented in software, the actual method steps may differ depending upon the manner in which the present invention is programmed. Given the teachings herein, one of ordinary skill in the related art will be able to contemplate these and similar implementations or configurations of the present invention. Indeed, while the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and, alternatives falling within the spirit and scope of the invention as defined by the appended claims.

What is claimed is:

1. A program storage device readable by a machine, tangibly embodying a program of instructions executable by the machine to perform method steps for evaluating an investment manager's skill, the method steps comprising:
   determining a time frame over which to calculate statistics, said time frame comprising a plurality of time periods of a predefined duration;
   determining a universe of asset returns according to a mandate of the manager;
   generating a predetermined number of return portfolios from the universe of assets to form a return distribution for each time period, said generating comprising the steps of:
      randomly selecting an asset from the universe, for each portfolio, generating a random weight for the selected asset in the portfolio, for each portfolio,
         wherein the random weight for each selected asset is constrained to be between a defined minimum and maximum value,
      calculating a return for the asset by multiplying an actual asset return by the generated weight for each asset, for each portfolio,
      summing the return of each asset to calculate a portfolio return, for each portfolio, and
      storing the portfolio return for each portfolio in the return distribution,
         wherein the steps of selecting an asset, generating a weight, calculating a return for the asset, and calculating a portfolio return are repeated until at least 100% of the portfolio weight has been allocated;
   obtaining return data for a manager for each given time period;
   standardizing the manager's return data for each given time period; and
   calculating measurement statistics to calculate the manager's performance over the plurality of time periods,
      wherein the measurement statistics include one or more of a mean, a standard deviation, a confidence interval, a regression coefficient, and a factor weight as determined by an analysis of variance, factor analysis or principle component analysis.

2. The method of claim 1, wherein more than 100% of the portfolio is allocated to account for leverage.

3. The method of claim 1, wherein the minimum value is different for one or more assets, and the maximum value is different for one or more assets.

4. The method of claim 1, further comprising the steps of segmenting the universe of assets returns into a plurality of sectors, identifying which sector to which an asset belongs and adding the return for the asset to a sector return, and storing sector returns.

5. The method of claim 4, further comprising the step of checking that a total weight of all assets in any one sector is constrained to be between a defined minimum and maximum value.

6. The method of claim 5, wherein the minimum value is different for one or more sectors, and the maximum value is different for one or more sectors.

7. The method of claim 5, wherein the random weight for each selected asset is constrained to be between a defined minimum and maximum value.

8. The method of claim 1, wherein the asset is a security.

9. The method of claim 1, wherein the asset is a portfolio of securities.

10. The method of claim 1, wherein the random weight for the selected asset in the portfolio represents a random quantity of securities in the portfolio.

11. A program storage device readable by a computer, tangibly embodying a program of instructions executable by the computer to perform the method steps for evaluating an investment manager's skill, said method comprising the steps of:
   determining a time frame over which to calculate statistics, said time frame comprising a plurality of time periods of a predefined duration;
   determining a universe of asset returns according to a mandate of the manager;
   generating a predetermined number of return portfolios from the universe of assets to form a return distribution for each time period, said generating comprising the steps of:
      randomly selecting an asset from universe, for each portfolio,
      generating a random weight for the selected asset in the portfolio, for each portfolio,
         wherein the random weight for each selected asset is constrained to be between a defined minimum and maximum value,
      calculating a return for the asset by multiplying an actual asset return by the generated weight for each asset, for each portfolio,
      summing the return of each asset to calculate a portfolio return, for each portfolio, and
      storing the portfolio return for each portfolio in the return distribution,
         wherein the steps of selecting an asset, generating a weight, calculating a return for the asset, and calculating a portfolio return are repeated until at least 100% of the portfolio weight has been allocated;

obtaining return data for a manager for each given time period;

standardizing the manager's return data for each given time period; and calculating measurement statistics to calculate the manager's performance over the plurality of time periods, wherein the measurement statistics include one or more of a mean, a standard deviation, a confidence interval, a regression coefficient, and a factor weight as determined by an analysis of variance, factor analysis or principal component analysis.

12. The computer readable program storage device of claim 11, wherein more than 100% of the portfolio is allocated to account for leverage.

13. The computer readable program storage device of claim 11, wherein the minimum value is different for one or more assets, and the maximum value is different for one or more assets.

14. The computer readable program storage device of claim 11, wherein the method further comprises the steps of segmenting the universe of assets returns into a plurality of sectors, identifying which sector to which an asset belongs and adding the return for the asset to a sector return, and storing sector returns.

15. The computer readable program storage device of claim 14, the method further comprising the step of checking that a total weight of all assets in any one sector is constrained to be between a minimum and maximum value.

16. The computer readable program storage device of claim 15, wherein the minimum value is different for one or more sectors, and the maximum value is different for one or more sectors.

17. The computer readable program storage device of claim 15, wherein the random weight for each selected asset is constrained to be between a minimum and maximum value.

18. The computer readable program storage device of claim 11, wherein the asset is a security.

19. The computer readable program storage device of claim 11, wherein the asset is a portfolio of securities.

20. The computer readable program storage device of claim 11, wherein the random weight for the selected asset in the portfolio represents a random quantity of securities in the portfolio.

* * * * *